(12) United States Patent
Gordon et al.

(10) Patent No.: US 9,785,145 B2
(45) Date of Patent: Oct. 10, 2017

(54) CONTROLLING DRIVING MODES OF SELF-DRIVING VEHICLES

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/820,620

(22) Filed: Aug. 7, 2015

(65) Prior Publication Data

US 2017/0038773 A1    Feb. 9, 2017

(51) Int. Cl.
*G01C 22/00*    (2006.01)
*G05D 1/00*    (2006.01)
(Continued)

(52) U.S. Cl.
CPC .......... *G05D 1/0061* (2013.01); *B60W 40/09* (2013.01); *G07C 5/008* (2013.01); *G08G 1/012* (2013.01);
(Continued)

(58) Field of Classification Search
None
See application file for complete search history.

(56) References Cited

U.S. PATENT DOCUMENTS

| 4,665,395 A | 5/1987 | Van Ness |
| 4,908,988 A | 3/1990 | Yamamura et al. |

(Continued)

FOREIGN PATENT DOCUMENTS

| CN | 1135063 | 11/1996 |
| CN | 2349068 Y | 11/1999 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Nicholas Kiswanto
*Assistant Examiner* — Kenny A Taveras
(74) *Attorney, Agent, or Firm* — Law Office of Jim Boice

(57) ABSTRACT

A computer-implemented method, system, and/or computer program product controls a driving mode of a self-driving vehicle (SDV). Sensor readings describe a current condition of a roadway, which is part of a planned route of a self-driving vehicle (SDV). One or more processors compare a control processor competence level of the on-board SDV control processor that autonomously controls the SDV to a human driver competence level of a human driver in controlling the SDV under the current condition of the roadway. One or more processors then selectively assign control of the SDV to the on-board SDV control processor or to the human driver based on which of the control processor competence level and the human driver competence level is relatively higher to the other.

20 Claims, 7 Drawing Sheets

(51) Int. Cl.
*B60W 40/09* (2012.01)
*G08G 1/01* (2006.01)
*G08G 1/0967* (2006.01)
*G07C 5/00* (2006.01)

(52) U.S. Cl.
CPC ......... *G08G 1/0112* (2013.01); *G08G 1/0129* (2013.01); *G08G 1/0133* (2013.01); *G08G 1/096725* (2013.01); *G08G 1/096741* (2013.01); *G08G 1/096775* (2013.01); *B60W 2540/00* (2013.01); *G05D 2201/0213* (2013.01)

(56) References Cited

U.S. PATENT DOCUMENTS

| | | | |
|---|---|---|---|
| 5,975,791 A | 11/1999 | McCulloch | |
| 6,064,970 A | 5/2000 | McMillian et al. | |
| 6,201,318 B1 | 3/2001 | Guillory | |
| 6,326,903 B1 | 12/2001 | Gross et al. | |
| 6,393,362 B1 | 5/2002 | Burns | |
| 6,502,035 B2 | 12/2002 | Levine | |
| 6,587,043 B1 | 7/2003 | Kramer | |
| 6,622,082 B1 | 9/2003 | Schmidt et al. | |
| 6,731,202 B1 | 5/2004 | Klaus | |
| 6,810,312 B2 | 10/2004 | Jammu et al. | |
| 7,124,088 B2 | 10/2006 | Bauer et al. | |
| 7,580,782 B2 | 8/2009 | Breed et al. | |
| 7,769,544 B2 | 8/2010 | Blesener et al. | |
| 7,877,269 B2 | 1/2011 | Bauer et al. | |
| 7,894,951 B2 * | 2/2011 | Norris .................. H04L 67/12 180/443 | |
| 7,979,173 B2 | 7/2011 | Breed | |
| 8,031,062 B2 | 10/2011 | Smith | |
| 8,045,455 B1 | 10/2011 | Agronow et al. | |
| 8,078,349 B1 * | 12/2011 | Prada Gomez ...... G05D 1/0061 701/1 | |
| 8,090,598 B2 * | 1/2012 | Bauer .................. G06Q 40/02 701/1 | |
| 8,139,109 B2 | 3/2012 | Schmiedel et al. | |
| 8,140,358 B1 | 3/2012 | Ling et al. | |
| 8,146,703 B2 | 4/2012 | Baumann et al. | |
| 8,152,325 B2 | 4/2012 | McDermott | |
| 8,190,322 B2 | 5/2012 | Lin et al. | |
| 8,346,480 B2 | 1/2013 | Trepagnier et al. | |
| 8,352,112 B2 | 1/2013 | Mudalige | |
| 8,442,854 B2 | 5/2013 | Lawton et al. | |
| 8,466,807 B2 | 6/2013 | Mudalige | |
| 8,489,434 B1 | 7/2013 | Otis et al. | |
| 8,509,982 B2 | 8/2013 | Montemerlo et al. | |
| 8,583,365 B2 | 11/2013 | Jang et al. | |
| 8,660,734 B2 * | 2/2014 | Zhu .................... G05D 1/0055 701/23 | |
| 8,676,466 B2 | 3/2014 | Mudalige | |
| 8,678,701 B1 | 3/2014 | Aldasem | |
| 8,786,461 B1 | 7/2014 | Daudelin | |
| 8,793,046 B2 | 7/2014 | Lombrozo et al. | |
| 8,816,857 B2 | 8/2014 | Nordin et al. | |
| 8,874,305 B2 | 10/2014 | Dolgov et al. | |
| 8,880,270 B1 | 11/2014 | Ferguson et al. | |
| 8,903,591 B1 | 12/2014 | Ferguson et al. | |
| 8,924,150 B2 | 12/2014 | Tsimhoni et al. | |
| 8,948,955 B2 | 2/2015 | Zhu et al. | |
| 8,949,016 B1 * | 2/2015 | Ferguson ............. B60W 30/00 340/436 | |
| 8,954,217 B1 | 2/2015 | Montemerlo et al. | |
| 8,954,252 B1 | 2/2015 | Urmson et al. | |
| 8,954,261 B2 | 2/2015 | Das et al. | |
| 8,958,943 B2 | 2/2015 | Bertosa et al. | |
| 8,965,621 B1 | 2/2015 | Urmson et al. | |
| 8,970,362 B2 | 3/2015 | Morley et al. | |
| 8,983,705 B2 | 3/2015 | Zhu et al. | |
| 8,996,224 B1 * | 3/2015 | Herbach ............. G05D 1/0011 180/116 | |
| 9,014,905 B1 | 4/2015 | Kretzschmar et al. | |
| 9,020,697 B2 | 4/2015 | Ricci et al. | |
| 9,024,787 B2 | 5/2015 | Alshinnawi et al. | |
| 9,082,239 B2 | 7/2015 | Ricci | |
| 9,123,049 B2 | 9/2015 | Hyde et al. | |
| 9,170,327 B2 | 10/2015 | Choe et al. | |
| 9,189,897 B1 * | 11/2015 | Stenneth ............... G07C 5/008 | |
| 9,194,168 B1 | 11/2015 | Lu et al. | |
| 9,216,745 B2 | 12/2015 | Beardsley et al. | |
| 9,286,520 B1 | 3/2016 | Lo et al. | |
| 9,305,411 B2 | 4/2016 | Ricci | |
| 9,317,033 B2 | 4/2016 | Ibanez-guzman et al. | |
| 9,390,451 B1 | 7/2016 | Slusar | |
| 9,399,472 B2 | 7/2016 | Minoiu-Enache | |
| 9,463,805 B2 | 10/2016 | Kirsch et al. | |
| 9,483,948 B1 * | 11/2016 | Gordon .................. G08G 1/166 | |
| 9,628,975 B1 | 4/2017 | Watkins et al. | |
| 9,646,496 B1 | 5/2017 | Miller | |
| 2002/0026841 A1 | 3/2002 | Svendsen | |
| 2003/0065572 A1 | 4/2003 | McNee et al. | |
| 2003/0076981 A1 | 4/2003 | Smith et al. | |
| 2004/0078133 A1 | 4/2004 | Miller | |
| 2004/0199306 A1 | 10/2004 | Heilmann et al. | |
| 2005/0104745 A1 | 5/2005 | Bachelder et al. | |
| 2006/0106671 A1 | 5/2006 | Biet | |
| 2006/0163939 A1 | 7/2006 | Kuramochi et al. | |
| 2006/0200379 A1 | 9/2006 | Biet | |
| 2006/0241855 A1 | 10/2006 | Joe et al. | |
| 2007/0100687 A1 | 5/2007 | Yoshikawa | |
| 2007/0124027 A1 | 5/2007 | Betzitza et al. | |
| 2008/0048850 A1 | 2/2008 | Yamada | |
| 2008/0114663 A1 | 5/2008 | Watkins et al. | |
| 2008/0129475 A1 | 6/2008 | Breed et al. | |
| 2008/0201217 A1 | 8/2008 | Bader et al. | |
| 2009/0094109 A1 | 4/2009 | Aaronson et al. | |
| 2009/0248231 A1 | 10/2009 | Kamiya | |
| 2009/0313096 A1 | 12/2009 | Kaga | |
| 2010/0057511 A1 | 3/2010 | Mansouri et al. | |
| 2010/0156672 A1 | 6/2010 | Yoo et al. | |
| 2010/0179720 A1 | 7/2010 | Lin et al. | |
| 2010/0228427 A1 | 9/2010 | Anderson et al. | |
| 2010/0256852 A1 | 10/2010 | Mudalige | |
| 2011/0035250 A1 | 2/2011 | Finucan | |
| 2011/0077807 A1 | 3/2011 | Hyde et al. | |
| 2011/0137699 A1 | 6/2011 | Ben-Ari et al. | |
| 2011/0264521 A1 | 10/2011 | Straka | |
| 2012/0072243 A1 | 3/2012 | Collins et al. | |
| 2012/0139756 A1 | 6/2012 | Djurkovic | |
| 2012/0277947 A1 | 11/2012 | Boehringer et al. | |
| 2013/0030657 A1 | 1/2013 | Chatterjee et al. | |
| 2013/0113634 A1 | 5/2013 | Hutchinson et al. | |
| 2013/0131949 A1 | 5/2013 | Shida | |
| 2013/0144502 A1 | 6/2013 | Shida | |
| 2013/0231824 A1 | 9/2013 | Wilson et al. | |
| 2013/0261871 A1 | 10/2013 | Hobbs et al. | |
| 2014/0019259 A1 | 1/2014 | Dung et al. | |
| 2014/0092332 A1 | 4/2014 | Price | |
| 2014/0095214 A1 * | 4/2014 | Mathe .................. G06Q 40/08 705/4 | |
| 2014/0129073 A1 | 5/2014 | Ferguson | |
| 2014/0136045 A1 | 5/2014 | Zhu et al. | |
| 2014/0136414 A1 | 5/2014 | Abhyanker | |
| 2014/0164126 A1 | 6/2014 | Nicholas et al. | |
| 2014/0188999 A1 | 7/2014 | Leonard et al. | |
| 2014/0195213 A1 * | 7/2014 | Kozloski ............. G06F 17/5009 703/8 | |
| 2014/0201037 A1 | 7/2014 | Mallawarachchi et al. | |
| 2014/0201126 A1 | 7/2014 | Zadeh | |
| 2014/0214255 A1 | 7/2014 | Dolgov et al. | |
| 2014/0222277 A1 * | 8/2014 | Tsimhoni ............. B60W 30/00 701/23 | |
| 2014/0222577 A1 | 8/2014 | Abhyanker | |
| 2014/0282967 A1 | 9/2014 | Maguire | |
| 2014/0297116 A1 | 10/2014 | Anderson et al. | |
| 2014/0306833 A1 | 10/2014 | Ricci | |
| 2014/0309789 A1 | 10/2014 | Ricci | |
| 2014/0309806 A1 | 10/2014 | Ricci | |
| 2014/0309864 A1 | 10/2014 | Ricci | |
| 2014/0309891 A1 | 10/2014 | Ricci | |
| 2014/0310186 A1 | 10/2014 | Ricci | |

(56) References Cited

U.S. PATENT DOCUMENTS

| | | | |
|---|---|---|---|
| 2014/0316671 A1 | 10/2014 | Okamoto | |
| 2014/0324268 A1 | 10/2014 | Montemerlo et al. | |
| 2014/0330479 A1 | 11/2014 | Dolgov | |
| 2014/0358331 A1 | 12/2014 | Prada Gomez et al. | |
| 2014/0358353 A1* | 12/2014 | Ibanez-Guzman | G05D 1/0027 701/23 |
| 2015/0006005 A1* | 1/2015 | Yu | G06Q 10/08 701/22 |
| 2015/0006014 A1 | 1/2015 | Wimmer et al. | |
| 2015/0026092 A1 | 1/2015 | Abboud et al. | |
| 2015/0035685 A1 | 2/2015 | Strickland et al. | |
| 2015/0051778 A1 | 2/2015 | Mueller | |
| 2015/0057891 A1 | 2/2015 | Mudalige et al. | |
| 2015/0062340 A1 | 3/2015 | Datta et al. | |
| 2015/0062469 A1 | 3/2015 | Fleury | |
| 2015/0066282 A1 | 3/2015 | Yopp | |
| 2015/0066284 A1 | 3/2015 | Yopp | |
| 2015/0070178 A1* | 3/2015 | Kline | G08B 21/02 340/576 |
| 2015/0095190 A1* | 4/2015 | Hammad | G06Q 20/14 705/26.8 |
| 2015/0120331 A1 | 4/2015 | Russo et al. | |
| 2015/0134178 A1* | 5/2015 | Minoiu-Enache | B60W 50/035 701/23 |
| 2015/0141043 A1 | 5/2015 | Abramson | |
| 2015/0149021 A1 | 5/2015 | Duncan et al. | |
| 2015/0160019 A1 | 6/2015 | Biswal et al. | |
| 2015/0166059 A1 | 6/2015 | Ko | |
| 2015/0175070 A1 | 6/2015 | Attard et al. | |
| 2015/0178998 A1 | 6/2015 | Attard et al. | |
| 2015/0196256 A1 | 7/2015 | Venkatraman et al. | |
| 2015/0232065 A1 | 8/2015 | Ricci et al. | |
| 2015/0293994 A1 | 10/2015 | Kelly | |
| 2015/0338226 A1 | 11/2015 | Mason et al. | |
| 2015/0339639 A1 | 11/2015 | Choe | |
| 2016/0001781 A1 | 1/2016 | Fung et al. | |
| 2016/0026182 A1* | 1/2016 | Boroditsky | H04L 67/306 701/23 |
| 2016/0075512 A1 | 3/2016 | Lert, Jr. | |
| 2016/0078695 A1 | 3/2016 | McClintic et al. | |
| 2016/0078758 A1* | 3/2016 | Basalamah | G08G 1/0112 701/118 |
| 2016/0090100 A1 | 3/2016 | Oyama et al. | |
| 2016/0139594 A1* | 5/2016 | Okumura | B60W 30/00 701/2 |
| 2016/0140507 A1 | 5/2016 | Stevens et al. | |
| 2016/0176409 A1 | 6/2016 | Kirsch et al. | |
| 2016/0303969 A1 | 10/2016 | Akula | |
| 2016/0334797 A1* | 11/2016 | Ross | G05D 1/0217 |
| 2016/0344737 A1 | 11/2016 | Anton | |
| 2016/0355192 A1 | 12/2016 | James et al. | |
| 2016/0364823 A1 | 12/2016 | Cao | |
| 2017/0010613 A1 | 1/2017 | Fukumoto | |
| 2017/0021830 A1 | 1/2017 | Feldman et al. | |
| 2017/0129487 A1 | 5/2017 | Wulf | |

FOREIGN PATENT DOCUMENTS

| | | |
|---|---|---|
| CN | 201004265 Y | 1/2008 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 3582236 A1 | 2/1994 |
| WO | 2014058263 A1 | 4/2014 |
| WO | 2014066721 A2 | 5/2014 |
| WO | 2014147361 A1 | 9/2014 |
| WO | 2014148975 A1 | 9/2014 |
| WO | 2014148976 A1 | 9/2014 |
| WO | 2015024616 A1 | 2/2015 |
| WO | 2015056105 A1 | 4/2015 |
| WO | 2015156146 A1 | 10/2015 |

OTHER PUBLICATIONS

M. Fox, "Self-driving cars safer than those driven by humans: Bob Lutz", CNBC, www.cnbc.com, Sep. 8, 2014, 1 page.

X. Jardin, "Terrifying dashcam video captures distracted teen drivers crashing while goofing off", Boing Boing, www.boingboing.net Mar. 26, 2015, 1 page.

Anonymous, "Car Built-In Mechanism to Enforce Mandatory Self-Driving Mode", IP.com, No. 000234916, Feb. 14, 2014, pp. 1-3.

T. Horberry et al., "Driver distracton: the effects of concurrent in-vehicle tasks, road environment complexity and age on driving performance", Elsevier Ltd., Accident Analysis and Prevention, 38, 2006, pp. 185-191.

U.S. Appl. No. 14/887,388, filed Oct. 20, 2015.

A. Abkowitz, "Do Self-Driving Cars Spell Doom for Auto Insurers?", Bloomberg L.P., Sep. 10, 2014, pp. 1-2.

Anonymous, "Self-Driving Cars and Insurance", Insurance Information Institute, Inc., Feb. 2015, pp. 1-3.

Gomes, Lee. "Google's Self-Driving Cars Still Face Many Obstacles / MIT Technology Review.", MIT Technology Review. Aug. 28, 2014. Web. <http://www.technologyreview.co,/news/530276/hidden-obstacles-for-googles-self-driving-cars/>.

Smith, Mark. "Inovations: Emerging Trends in the Wheelchair Market." New Mobility Magazine, Aug. 1, 2014. Web. <http://www/newmobility.com/2014/08/emerging-trends/>.

Crothers, Brooke. "Google Now Reporting Self-Driving Car Accidents: Her, It's Not the Car's Fault". forbes.com, Jun. 8, 2015. <http://www.forbes.com/sites/brookecrothers/2015/06/08/google-now-reportibg-driverless-car-accidents/>.

Anonymous, 'System and Method to Target Advertisements for the Right Focus Group'. ip.com, No. 000218285, May 31, 2012, pp. 1-2.

E. Lehrer, "The Insurance Implications of Google's Self-Driving Car", Insurance Journal, Right Street BLOH=G, May 28, 2014, pp. 1-2.

Chen S, et al., A Crash Risk Assessment Model for Roas Curves. Inproceedings 20th International Technical Conference on the Enhanced Saftey of Vehicles., 2007. Lyon, France.

J. Miller, "Self-Driving Car Technologu'S Benefits, Potential Risks, and Solutions", The Energy Collective, theenergycollective.com, Aug. 19, 2014, pp. 1-7.

J. O'Callaghan, "Inside the Mercedes Self-Guidubg Car That'S Built for Luxurious Living in, Not Driving", Associated Newspapers Ltd., Daily Mail, dailymail.com.uk, Jan. 6, 2015, pp. 1-13.

J. Wei et al., "Towards a Viable Autonomous Driving Research Platform", IEEE, Intelegent Vehicles Symposium (IV), 2013, pp. 1-8.

J. Farrier, "Airlines Infuse Their Planes With Smells to Calm You Down", Neatorama, neatorama.com, Mar. 29, 2015, 1 Page.

T. Vanderbilt, "Let the Robot Drive: The Autonomous Car of the Future Is Here", Wired Magazine, Conde NAST, www.wired.com, Jan. 20, 2012. pp. 1-34.

Anonymous, "Diagnostics Mechanism for Self-Driving Cars to Validate Self-Driving Capabilities", ip.com, Jun. 6, 2014, pp. 1-5. ip.com.

U.S. Appl. No. 14/855,731 Non-Final Office Action dated Apr. 15, 2016.

Brownell, "Shared Autonomous Taxi Networks: An Analysis of Transportation Demand in NJ and a 21st Century Solution for Congestion", Dissertation, Princeton University, 2013, pp. 1-122.

Sessa et al., "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.

Lutin et al., "The Revolutionary Development of Self-Driving Vehicles and Implications for the Transportation Engineering Profession", ITE Journal 83.7, 2013, pp. 28-32.

A. Hars, "Self-Driving Cars: The Digital Transformation of Mobility", Marktplatze Im Umbruch, Springer Berlin Heidelberg, 2015, pp. 539-549.

(56) References Cited

OTHER PUBLICATIONS

Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.

Anonymous, "Avoiding Crashes With Self-Driving Cars: Today'S Crash-Avoidance Systems Are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.

Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/GOOGLE-FILES-PATENT-FOR-SECOND-GEN-AUTONOMOUS-VEHICLE-WITHOUT-A-STEERING-WHEEL-BRAKE-PEDAL-MORE.HTML>.

C. Berger et al., "COTS-Architecture With a Real-Time OS for a Self-Driving Miniature Vehicle", SAFECOMP 2013—Workshop ASCOMS of the 32nd International Conference on Computer Safety, Reliability and Security, Sep. 2013, Toulouse, France, pp. 1-13.

\* cited by examiner

CONTROLLING DRIVING MODES OF SELF-DRIVING VEHICLES

BACKGROUND

The present disclosure relates to the field of vehicles, and specifically to the field of self-driving vehicles. Still more specifically, the present disclosure relates to the field of controlling whether self-driving vehicles operate in autonomous mode or manual mode.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

A computer-implemented method, system, and/or computer program product controls a driving mode of a self-driving vehicle (SDV). One or more processors receive sensor readings from a sensor. The sensor readings describe a current condition of a roadway, which is part of a planned route of a self-driving vehicle (SDV). The SDV is capable of being operated in autonomous mode by an on-board SDV control processor, or by a human driver in manual mode. A driving mode module on the SDV selectively controls whether the SDV is operated in the autonomous mode or in the manual mode. One or more processors determine a control processor competence level of the on-board SDV control processor. The control processor competence level describes a competence level of the on-board SDV control processor in controlling the SDV under the current condition of the roadway. One or more processors receive a driver profile of the human driver of the SDV. The driver profile describes a human driver competence level of the human driver in controlling the SDV under the current condition of the roadway. One or more processors compare the control processor competence level to the human driver competence level. One or more processors then selectively assign control of the SDV to the on-board SDV control processor or to the human driver based on which of the control processor competence level and the human driver competence level is relatively higher to the other.

DETAILED DESCRIPTION

Figure 1:
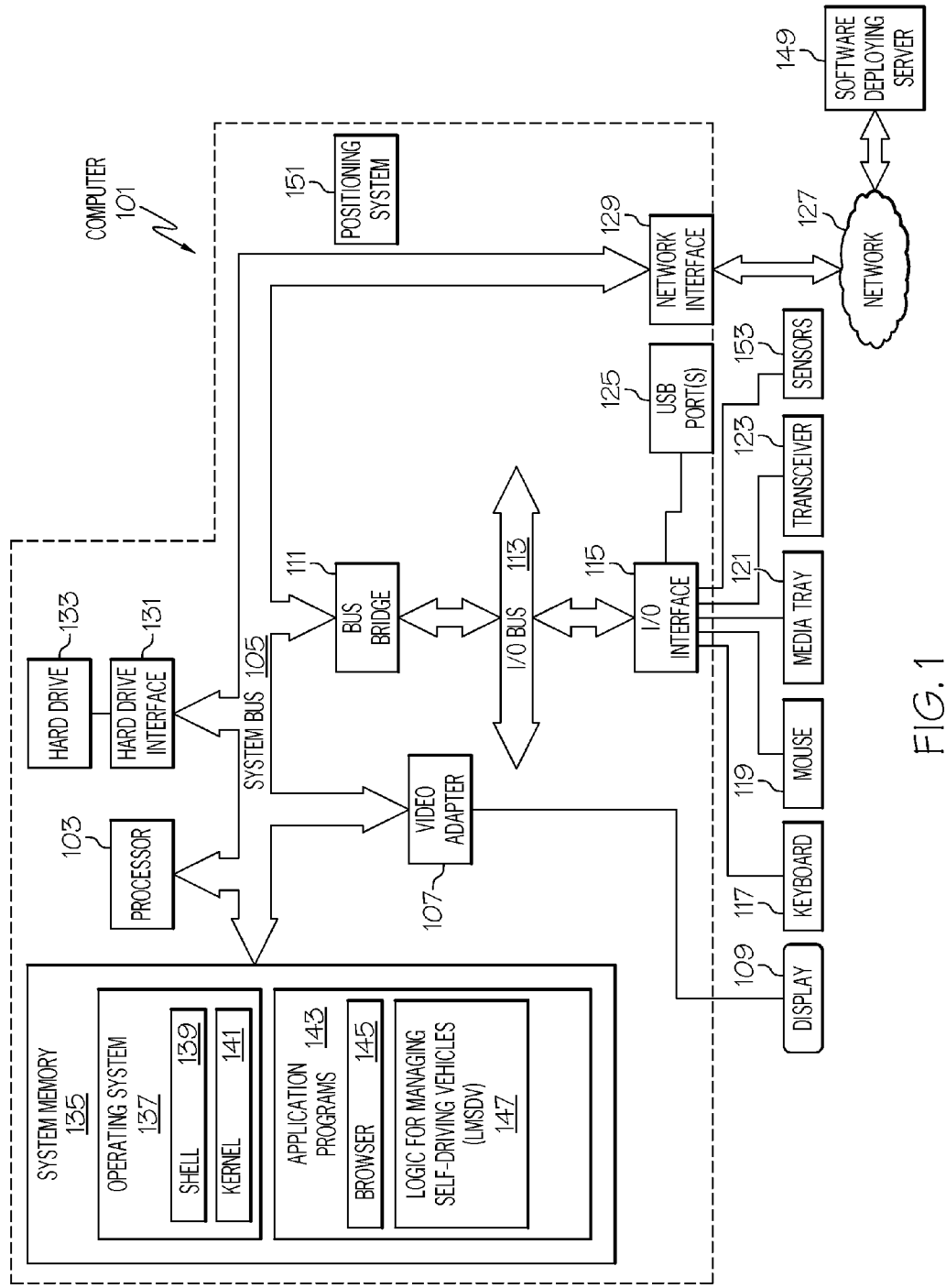
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or roadside beacons 210 shown in FIG. 2, and/or a self-driving vehicle (SDV) on-board computer 301 shown in FIG. 3, and/or a coordinating server 401 depicted in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., establishing communication among SDV 202, SDV 204, and/or coordinating server 401 depicted in the figures below) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Self-Driving Vehicles (LMSDV) 147. LMSDV 147 includes code for implementing the processes described below, including those described in FIGS. 2-5. In one embodiment, computer 101 is able to download LMSDV 147 from software deploying server 149, including in an on-demand basis, wherein the code in LMSDV 147 is not downloaded until needed for execution. In one embodiment of the present invention, software deploying server 149 performs all of the functions associated with the present invention (including execution of LMSDV 147), thus freeing computer 101 from having to use its own internal computing resources to execute LMSDV 147.

Also within computer 101 is a positioning system 151, which determines a real-time current location of computer 101 (particularly when part of an emergency vehicle and/or a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, moisture detectors, etc. that detect ambient weather conditions.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
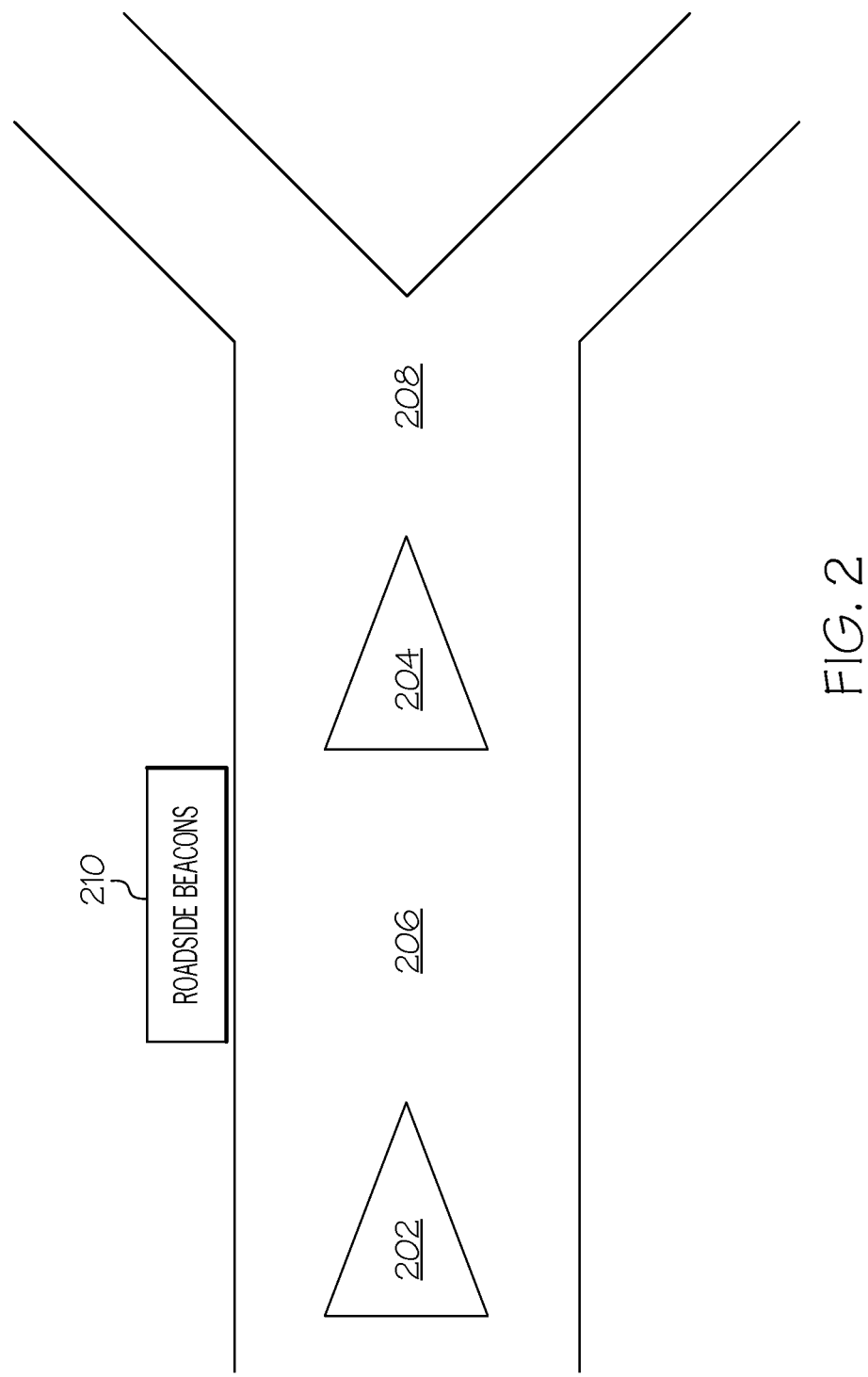
FIG. 2 illustrates an exemplary self-driving vehicle (SDV) approaching a change in a roadway in accordance with one or more embodiments of the present invention.

With reference now to FIG. 2, an exemplary self-driving vehicle (SDV) 202 and an SDV 204 traveling along a roadway 206 in accordance with one or more embodiments of the present invention is presented. As shown, SDV 202 will be approaching a change in the roadway 206, depicted in FIG. 2 as a split 208. This change in the roadway 206 may be an intersection, an overpass, a stop light, a toll booth, a bend in the road, or any feature other than a straight and unobstructed roadway.

Figure 3:
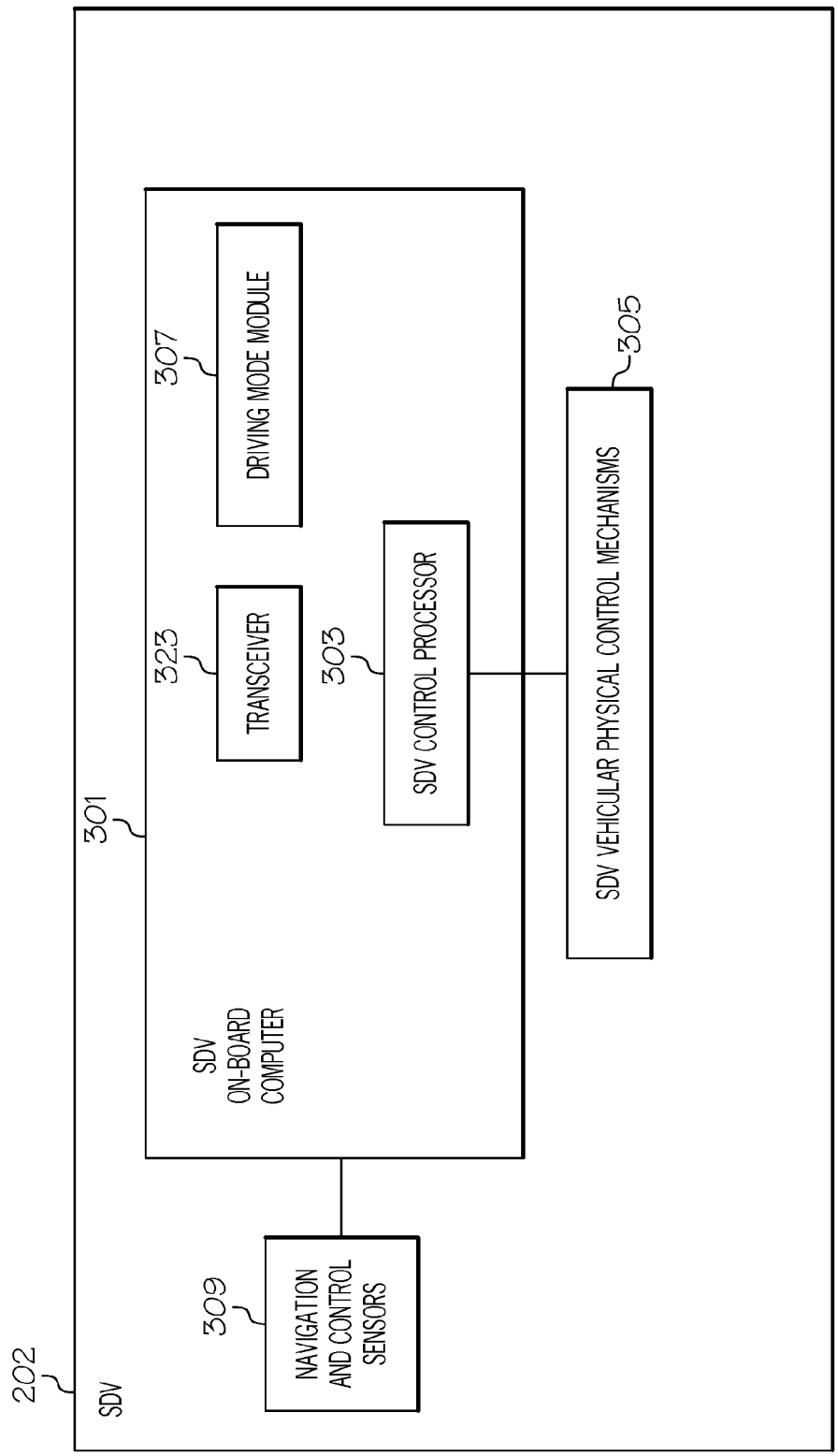
FIG. 3 depicts additional detail of control hardware within an SDV.

Additional details of one or more embodiments of the SDV 202 (which may have a same architecture as SDV 204) are presented in FIG. 3. As shown in FIG. 3, SDV 202 has an SDV on-board computer 301 that controls operations of the SDV 202. According to directives from a driving mode module 307, the SDV 202 can be selectively operated in manual mode or autonomous mode. In a preferred embodiment, driving mode module 307 is a dedicated hardware device that selectively directs the SDV on-board computer 301 to operate the SDV 202 in autonomous mode or manual mode.

While in manual mode, SDV 202 operates as a traditional motor vehicle, in which a human driver controls the engine throttle, engine on/off switch, steering mechanism, braking system, horn, signals, etc. found on a motor vehicle. These vehicle mechanisms may be operated in a "drive-by-wire" manner, in which inputs to an SDV control processor 303 by the driver result in output signals that control the SDV vehicular physical control mechanisms 305 (e.g., the engine throttle, steering mechanisms, braking systems, turn signals, etc.).

While in autonomous mode, SDV 202 operates without the input of a human driver, such that the engine, steering mechanism, braking system, horn, signals, etc. are controlled by the SDV control processor 303, but now under the control of the SDV on-board computer 301. That is, by processing inputs taken from navigation and control sensors 309 and the driving mode module 307 indicating that the SDV 202 is to be controlled autonomously, then driver inputs are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). By measuring the time it takes to receive back the emitted electromagnetic radiation, and/or evaluating a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

Current conditions of the roadway 206, including weather conditions, traffic conditions, construction events, accident events, etc., can be determined and transmitted by the roadside beacons 210. That is, roadside beacons 210 are able to determine current roadway conditions based on internal sensors 153 shown in FIG. 1, and/or from information received from SDV 202 and/or SDV 204, and/or from information received by an information service (e.g., a weather station).

Returning now to FIG. 2, assume that SDV 202 will soon be approaching a split 208 in roadway 206. Various factors are considered under the present invention as to whether SDV 202 should be controlled in the autonomous mode or the manual mode described above. Such factors include, but are not limited to, the nature of the split 208 (i.e., how difficult it will be to negotiate the split 208 based on the angles of the split 208, the amount of forewarning regarding the presence and shape of the split 208, the complexity of the split 208, etc.). Other factors include current road conditions of the roadway 206, the driving ability of the driver of the SDV 202, the accuracy of environmental and other sensors (e.g., sensors 153 shown in FIG. 1) mounted on the SDV 202, learned traffic patterns for SDVs on the roadway 206 and/or at the split 208, and/or current mechanical states and conditions of the SDV 202.

Figure 4:
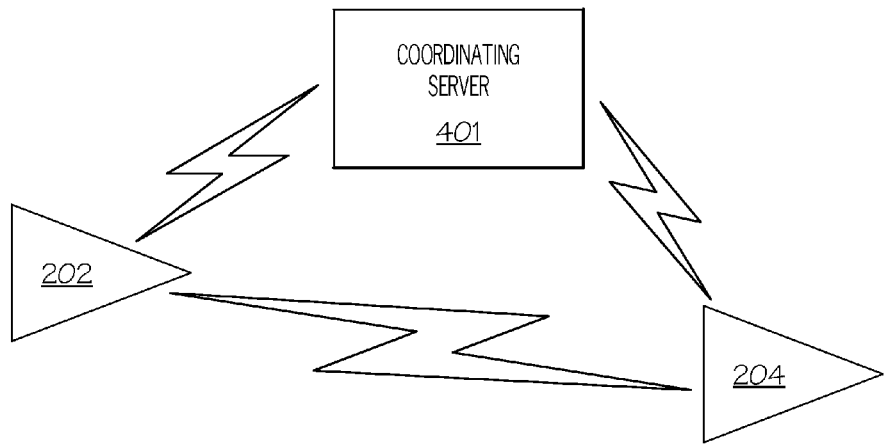
FIG. 4 depicts communication linkages among SDVs and a coordinating server.

Messages describing these factors to be used by the SDV 202 may come from the SDV 202 itself, another SDV (e.g., SDV 204), the roadside beacons 210, and/or the coordinating server 401 shown in FIG. 4. Coordinating server 401 may coordinate the control of the driving mode (i.e., autonomous or manual) of the SDVs 202/204, and/or may receive current roadway conditions of roadway 206 and/or split 208 from information detected by roadside beacons 210, SDV 202, SDV 204, and/or coordinating server 401 itself (assuming that coordinating server 401 has sensors capable of detecting the current roadway conditions of roadway 206 and/or split 208). As depicted in FIG. 4, coordinating server 401 and/or SDV 202 and/or SDV 204 are able to communicate with one another wirelessly, using a wireless transceiver (e.g., transceiver 123 shown in FIG. 1) that is found in each of the coordinating server 401 and/or SDV 202 and/or SDV 204.

Figure 5:
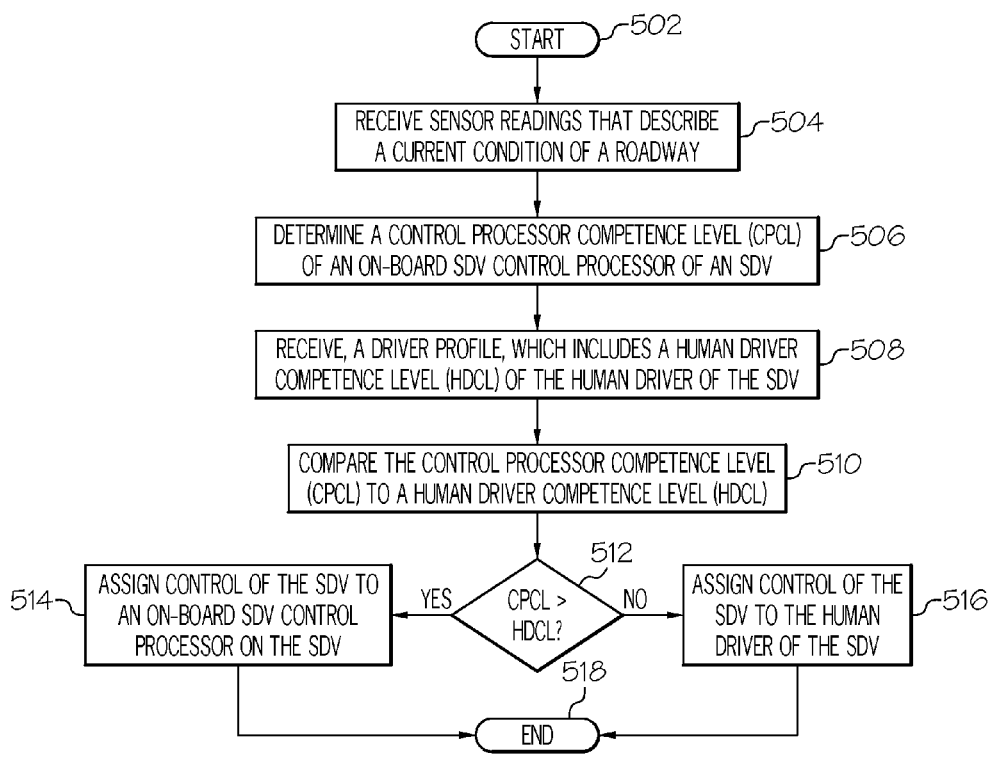
FIG. 5 is a high-level flow chart of one or more steps performed by one or more processors to control a driving mode of an SDV in accordance with one or more embodiments of the present invention.

With reference now to FIG. 5, a high-level flow chart of one or more steps performed by one or more processors to control a driving mode of an SDV in accordance with one or more embodiments of the present invention is presented.

After initiator block 502, one or more processors (e.g., processor 103 shown in FIG. 1) receive sensor readings from a sensor (e.g., one or more of the sensors 153 shown in FIG. 1), as described in block 504. These sensor readings describe a current condition of a roadway (e.g., roadway 206 shown in FIG. 2). The roadway is part of a planned route of a self-driving vehicle (SDV), such as the SDV 202 shown in FIG. 2. The SDV is capable of being operated in autonomous mode by an on-board SDV control processor (e.g., SDV control processor 303 shown in FIG. 3). A driving mode module selectively controls whether the SDV is operated in the autonomous mode (by the on-board SDV control processor) or in manual mode (in which the SDV is controlled by a human driver of the SDV).

As shown in block 506, one or more processors determine a control processor competence level of the on-board SDV control processor. The control processor competence level describes a competence level of the on-board SDV control processor in controlling the SDV under the current condition of the roadway. Various approaches may be used to determine this control processor competence level.

In one embodiment of the present invention, the control processor competence level of the on-board SDV control processor is history-based. That is, a record is reviewed on how effective the on-board SDV control processor has been in controlling the current SDV 202 or similar types of SDVs (i.e., SDVs that have the same design and/or performance characteristics as SDV 202) on roadways having similar environmental (traffic, weather, etc.) conditions as the current roadway 206. This effectiveness may be based on past 1) accident frequency, 2) travel speed, 3) stopping and starting, 4) gas mileage, etc. That is, the control processor competence level of the on-board SDV control processor describes how well the on-board SDV control processor has been controlling SDV 202 or similar SDVs in terms of safety, cost, consistency, etc.

In one embodiment of the present invention, the control processor competence level of the on-board SDV control processor is based on an analysis of capability of the on-board SDV control processor. That is, a review of what control features can be handled by the on-board SDV control processor is used to define the control processor competence level of the on-board SDV control processor. For example, assume that such a review confirms that the on-board SDV control processor is able to control the speed of the SDV 202 (i.e., "cruise control"), but nothing else. As such, the control processor competence level of this on-board SDV control processor is relatively low when compared to an on-board SDV control processor that is able to automatically maintain safety distances (buffers of space) between other vehicles. Similarly, the control processor competence level of the on-board SDV control processor that can also maintain safety space cushions around the SDV has a control processor competence level that is lower than an on-board SDV control processor that is able to not only control the speed and safety cushion around the SDV, but can also control the steering of the SDV.

As described in block 508 of FIG. 5, one or more processors receive a driver profile of the human driver of the SDV. This driver profile describes a human driver competence level of the human driver in controlling the SDV under the current condition of the roadway.

In one embodiment of the present invention, the human driver competence level of the human driver is history-based. That is, a record is reviewed on how effectively this driver has controlled the current SDV 202 or similar types of SDVs on roadways having similar environmental (traffic, weather, etc.) conditions as the current roadway 206. This effectiveness may be based on past 1) accident frequency, 2) travel speed, 3) stopping and starting, 4) gas mileage, etc. That is, the human driver competence level of the human driver describes how well the current driver has controlled this or similar SDVs in terms of safety, cost, consistency, etc. in the past.

In one embodiment of the present invention, the human driver competence level of the human driver is based on an analysis of capability of this human driver based on his traits/profile. That is, a review of this human driver's traits can lead to a conclusion regarding the strengths and weaknesses of this driver. For example, if this human driver has a record of poor night vision (as evidenced by a restriction on his/her license preventing him from driving at night), then the competence level of this driver to control a vehicle at night is low.

As described in block 510 in FIG. 5, one or more processors then compare the control processor competence level to the human driver competence level. In order to compare these two levels, different approaches can be taken.

In one embodiment of the present invention, each control factor (e.g., driving the SDV at night) is compared using the on-board SDV control processor versus the human driver. Each control factor that is relevant to current roadway conditions (e.g., driving at night in rainy conditions) is evaluated for both the on-board SDV control processor and the human driver. The control factors are then summed, in order to determine whether the on-board SDV control processor of the human driver is better at handling the SDV under the current roadway conditions.

In one embodiment of the present invention, the control factors being compared and evaluated (for the on-board SDV control processor versus the human driver) are weighted according to their predetermined significance to the overall control of the SDV. For example, a review of all traffic accidents may show that failure to properly control spatial cushions between vehicles caused more accidents than failing to signal. Therefore, the control factor of failing to maintain spatial buffers around the vehicle is weighted more heavily than the control factor of controlling turn signals.

In one embodiment of the present invention, the control processor competence level and/or the human driver competence level are purely outcome based. That is, a history of safety, fuel efficiency, traffic flow (consistent or speeding up/slowing down), etc. of SDVs on the current roadway under similar environmental conditions (e.g., time of day, day of week, season, weather conditions, etc.) are compared when being driven by the type of on-board SDV control processor in use by SDV 202 to a human driver having a similar profile as the current driver of the SDV 202. Whichever type of operator (i.e., the on-board SDV control processor of the human driver) has been able to drive the SDV, under conditions similar to the current conditions of the roadway, in a safer and more efficient manner is deemed to have a higher competence level.

A shown in query block 512, a query is made as to which competence level is higher: the control processor competence level (CPCL) or the human driver competence level (HDCL). If the on-board SDV control processor is deemed to be better than the human driver in controlling the SDV under current roadway conditions (i.e., the on-board SDV control processor has a relatively higher competence level than that of the human driver), then control of the SDV is assigned to the on-board SDV (block 514). That is, the SDV is placed in autonomous mode.

However, if the human driver is deemed to be better than the on-board SDV control processor in controlling the SDV under current roadway conditions (i.e., the human driver has a relatively higher competence level than that of the on-board SDV control processor), then control of the SDV is assigned to the human (i.e., the SDV is placed in manual mode), as described in block 516.

The flow-chart in FIG. 5 ends at terminator block 518.

In one embodiment of the present invention, one or more processors receive a manual input, which describes the current condition of the roadway, wherein the manual input overrides sensor readings that describe the current condition of the roadway. For example, assume that sensors (e.g., sensors 153 in FIG. 1) report that current visibility around the SDV 202 is good. Assume further that a touch-screen (e.g., display 109 shown in FIG. 1) in the cockpit of the SDV 202 receives a manual input from the driver indicating that current visibility is poor due to fog. This discrepancy may be due to the fact that the sensors 153 may be set to a fixed level of sensitivity, such that they are able to "see through" the fog at a level that is better than this particular driver.

As such, one or more processor will then define an updated current condition ("poor visibility due to fog") of the roadway, based on the manual input.

Based on this updated current condition of the roadway, one or more processors re-determine the control processor competence level of the on-board SDV control processor, in order to create a re-determined control processor competence level;

Similarly, one or more processors redefine the driver profile of the human driver of the SDV based on the updated current condition of the roadway from the manual input to create a redefined human driver competence level.

The one or more processors then compare the re-determined control processor competence level to the redefined human driver competence level, and selectively assign control of the SDV to the on-board SDV control processor or the human driver based on which of the re-determined control processor competence level and the redefined human driver competence level is relatively higher to one another. That is, if the on-board SDV control processor is deemed to be more competent than the driver (based on the driver's manual input describing his perceived roadway conditions), then the on-board SDV control processor will control the SDV, even if the driver may be better at controlling the SDV under conditions as perceived by the on-board sensors.

In one embodiment of the present invention, the sensor (e.g., one of sensors 153 shown in FIG. 1) used to describe current conditions of the roadway is mounted on the SDV. Sensor readings produced by the sensor describe environmental conditions of the SDV in real time. In this embodiment, one or more processors receive an environmental report from an environmental reporting service. The environmental report describes a general condition for the roadway. For example, a weather service ("environmental reporting service") may report via a data link (e.g., network 127 in FIG. 1) to processors on the SDV that there is icing occurring on the roadway 206 shown in FIG. 2.

One or more processors then compare environmental information from the environmental report to the sensor readings that describe the environmental conditions of the SDV in real time. In response to the environmental report disagreeing with the sensor readings, one or more processors disregard the sensor readings from the sensor and use the environmental report to describe the current condition of the roadway. That is, the processors will trust the weather report of ice on the roadway over what the sensors detect, since the sensors are only able to detect ice conditions (if at all) on the surface below the SDV at any point in time.

In one embodiment of the present invention, one or more processors retrieve driver profile information about the human driver of the SDV. The human driver of the SDV is assigned to a cohort of drivers traveling on the roadway in multiple SDVs. The current human driver of the SDV shares more than a predetermined quantity of traits with members of the cohort of drivers. The processor(s) retrieve traffic pattern data for the multiple SDVs occupied by the cohort of drivers traveling on the roadway, and then examine the traffic pattern data to determine a first traffic flow of the multiple SDVs occupied by members of the cohort of drivers. The SDVs in the first traffic flow are operating in the autonomous mode on the roadway.

The processor(s) also examine the traffic pattern data to determine a second traffic flow of the multiple SDVs occupied by members of the cohort of drivers. The multiple SDVs in the second traffic flow are operating in the manual mode on the roadway.

In response to determining that the first traffic flow has a lower accident rate than the second traffic flow, the processor(s) prohibit the SDV from operating in the manual mode.

For example, assume that a particular driver/occupant of an SDV has a characteristic (e.g., a history of traffic accidents while driving a vehicle in manual mode) found in other members of a cohort of drivers. Assume further that historical data shows that these cohort members have a history of accidents that is greater than that of on-board SDV control processors. Thus, if a particular driver matches up with the features found in members of this cohort, an assumption is made that this particular driver too is not as skilled as the on-board SDV control processor. As such, the control of the SDV is required to stay in autonomous mode, and is prohibited from switching to manual mode.

Similarly, assume that SDV 202 has characteristics (e.g., make, model, size, etc.) found in other members of a cohort of SDVs. Assume that this characteristic/trait affects the SDVs ability to respond to emergency situations (such as obstacles in the road) when operating in autonomous mode. Assume further that historical data shows that these cohort members (e.g., particular makes and models of SDVs) have a history of fewer accidents with obstacles on roadways when auto-control (i.e., enabling an autonomous mode of control) is activated. As such, the system will automatically engage the autonomous mode of control for such SDVs, including SDV 202.

In one embodiment of the present invention, sensor readings are weighted and summed in order to determine whether or not an SDV should be required to operate in autonomous mode. Thus, one or more processors receive sensor readings from multiple sensors, where each of the multiple sensors detects a different type of current condition of the roadway. The processor(s) weight each of the sensor readings for different current conditions of the roadway, and then sum the weighted sensor readings for the different current conditions of the roadway. The processor(s) determine whether the summed weighted sensor readings exceed a predefined level. In response to determining that the summed weighted sensor readings do exceed a predefined level, the on-board SDV control processor prohibits the SDV from operating in the manual mode. For example, assume that a first sensor detects ice on the roadway and the second sensor detects cabin temperatures. Assume further that historical data shows that many more accidents are caused by "black ice" (ice that is not visible to the eye of the driver) than a chilly cabin of the SDV. As such, the sensor readings from sensors that detect black ice are weighted more heavily than sensor readings about cabin temperature. These weighted sensor readings are then added up. If the summed sensor reading weighted values exceed some predetermined value (which has been predetermined based on historic or engineering analyses as being a breakpoint over which the chance of accidents greatly increase), then control of the SDV must go into autonomous mode. However, if the summed sensor reading weighted values fall below this predetermined value, then control is pushed to the manual mode.

In an embodiment of the present invention, the decision to place the SDV in autonomous mode is based on the condition of mechanical systems on the SDV. For example, if the braking system of the SDV is in poor condition (e.g., the brake pads are worn down, such that it takes the SDV longer to stop than if the SDV had new brake pads), then autonomous mode may be preferable to manual mode, since the autonomous mode will likely apply the brakes sooner than a driver. Thus, in the embodiment, one or more processors receive operational readings from one or more operational sensors on the SDV. These operational sensors detect a current state of mechanical equipment on the SDV. The processor(s) then detect, based on received operational readings, a mechanical fault (e.g., faulty brakes, loose steering linkage, etc.) with the mechanical equipment on the SDV. In response to detecting the mechanical fault with the mechanical equipment on the SDV, the on-board SDV control processor (e.g., SDV control processor 303 shown in FIG. 3) prohibits the SDV from operating in the manual mode (i.e., require the SDV to be in autonomous mode).

In an embodiment of the present invention, if neither the autonomous mode nor the manual mode controls the SDV in a safe manner, then the SDV is autonomously pulled over to the side of the road and stopped. Thus, in this embodiment one or more processors set a minimum competence level threshold for the control processor competence level and the human driver competence level described above. The processor(s) then determine that neither the control processor competence level nor the human driver competence level meets or exceeds the minimum competence level threshold. In response to determining that neither the control processor competence level nor the human driver competence level exceeds the minimum competence level threshold, the driving mode module (e.g., driving mode module 307 in FIG. 3) directs the on-board SDV control processor to take control of the SDV and to bring the SDV to a stop.

In one embodiment, the decision by the driving mode module 307 in FIG. 3 to place the SDV in autonomous mode or manual mode is dictated by how well a particular driver handles a particular geometry of the roadway 206 shown in FIG. 2. For example, assume that a particular driver manually maneuvers the SDV 206 around a cloverleaf exchange, in which the roadway loops around onto itself If a driver does poorly in negotiating this cloverleaf exchange (e.g., hits the side of the cloverleaf barrier, is erratic in accelerating and/or braking through the cloverleaf, travels well above or well below the posted speed limit for the cloverleaf, etc.), as detected by various sensors 153 on the SDV 202, then the system will not let that driver negotiate through future and similarly configured (e.g., shaped) cloverleaves on the roadway. Rather, the system (e.g., driving mode module 307) will automatically engage the autonomous mode when the similarly configured cloverleaf comes up.

In one embodiment of the present invention, a weighted voting system is used to weight the various variables used in making the decisions regarding whether to place the SDV in autonomous mode or manual mode. Such inputs may include: a history of accidents on a roadway for SDVs in autonomous mode compared to SDVs on the roadway in manual mode, a level of fuel usage/efficiency of SDVs in autonomous mode compared to SDVs on the roadway in manual mode, etc. Such weighted voting approaches may be characterized primarily by three aspects—the inputs (e.g., accident rates, fuel usage), the weights (e.g., weighting accident rates higher than fuel usage levels), and the quota (e.g., how many weighted inputs must be received in order to determine which control mode to use). The inputs are (I1, I2, . . . , IN), where "N" denotes the total number of inputs. An input's weight (w) is the number of "votes" associated with the input to determine how significant (weighted) the input is. A quota (q) is the minimum number of votes required to "pass a motion", which in this case refers to a decision made to place the SDV in autonomous mode or manual mode.

As described above, the present invention provides a process for selectively switching from autonomous mode to manual mode. However, if such switching back and forth occurs too frequently, safety issues may arise. For example, if the driving mode module 307 in FIG. 3 switched control of the SDV 202 from the manual mode to the autonomous mode (as described herein), and then switched control of the SDV 202 back to the manual mode a few seconds later, the driver and/or SDV will likely become confused and/or ineffective.

Therefore, in one embodiment of the present invention, a predefined time limit and/or physical distance is set between switching back and forth between control modes. For example, based on historical data that describes how long the current driver (and/or drivers from a cohort of drivers that have similar traits/characteristics as the current driver) needs to recover from relinquishing control of the SDV to the autonomous controller, the predefined time limit may be one minute. Similarly, based on historical data that describes how far the current driver must travel in order to recover from relinquishing control of the SDV to the autonomous controller, the predefined physical distance may be one mile. Therefore, if the system has switched from the manual mode to the autonomous mode, then one minute must pass and/or one mile must be traversed by the SDV before control can be returned back to the driver (e.g., manual mode is re-activated).

As disclosed herein in one or more embodiments, a system and/or method utilizes maps, road topologies, municipalities, traffic congestion, pothole density, the number and distribution of traffic lights etc. to control the entering and leaving of the SDV (self-driving vehicle) mode (or an audible suggestion to enter or leave such a mode), such that the desired mode change may be suggested rather than actually triggered. Thus, rather than actually directly controlling the assignment of control to either the autonomous mode or the manual mode, a suggestion can be made to the driver to choose either the autonomous mode or the manual mode. This allows the driver to always have control of whether or not the autonomous mode or the manual mode is used to control the SDV.

If maps of roadway topologies (i.e., shapes, directions, width, etc. of a roadway) are used to determine which control mode (autonomous or manual) is used by an SDV, a complexity of a roadway topology (as depicted on the maps) may be used to make this determination. For example, if a map shows a highly convoluted section of roadway or freeway interchange, the autonomous mode may be automatically engaged, based solely on the system recognizing the convoluted/complex nature of the upcoming section of roadway.

If municipalities are used to determine which control mode is used by an SDV, then the presence of a municipality through which the roadway traverses may be used to make this determination. For example, assume that a particular roadway passes through both rural areas and urban areas. When the SDV is traveling through rural areas, different rules for engaging manual or autonomous modes will apply compared to when the SDV is traveling through urban areas. For example, a predetermination may be made (based on historical safety data) that it is safer to engage the autonomous mode when in a rural area (since drivers often lose mental focus while traveling on sparsely-traveled roadways). However, a predetermination can also be made (based on historical safety data) that it is safer to engage the manual mode when in urban areas, since drivers are more alert, and autonomous modes may be too conservative, thus causing unnecessary traffic backups.

Similarly, if traffic congestion is used to determine which control mode is used by an SDV, then predeterminations (based on historical safety data) may determine that it is safer and/or results in smoother flowing traffic if the SDV is in autonomous mode if traffic conditions are heavy (since a pack of autonomously controlled SDVs can accelerate and decelerate in union, even if closely positioned), while it may be more efficient to engage the manual mode (based on historical traffic pattern analysis) if the traffic is light (since an individual driver may be able to negotiate lane changes, and thus increased traffic flow, better than an on-board computer).

Similarly, if pothole density is used to determine which control mode is used by an SDV, then predeterminations (based on historical safety and/or traffic flow data) may be made that controlling the SDV in the autonomous mode is safer/more efficient (since infrared and other low-light sensors on the SDV are able to detect upcoming potholes, even in low visibility conditions), while it may be deemed more efficient to engage the manual mode (based on historical traffic pattern and safety analysis) in areas where there are no potholes (thus allowing the driver to drive without braking or swerving in response to potholes in the roadway).

Similarly, if number and distribution of traffic lights is used to determine which control mode is used by an SDV, then predeterminations (based on historical safety and/or traffic flow data) may be made that controlling the SDV in autonomous mode may be safer and/or more efficient in areas having a high density of traffic lights (due to the SDV's ability in autonomous mode to know the timing of the traffic lights), while the SDV may be more efficient and/or safer in manual mode in areas with few traffic lights (where travel from one light to another is more variable). Furthermore, in scenarios in which there is a high density of traffic lights, the SDV may be able to communicate with the traffic lights in order to control the traffic lights. That is, a group of SDVs may be able to "vote" to turn a light green at an intersection. If more SDVs coming from a first direction outvote the SDVs coming from another direction (due to their sheer quantity), then the higher number of SDVs will get the green light.

In one embodiment of the present invention, the cognitive load required of a driver on certain roadways is considered when choosing either the autonomous mode or the manual mode. That is, a study of driver habits and roadway conditions may show that for a particular section of roadway, a driver must exercise 5 specific cognitive decisions, including 1) watching for ice that is present on the roadway, 2) watching for animals that are present on the roadway, 3) negotiating with large trucks that are present on the roadway, 4) negotiating with other vehicles that are exceeding the posted speed limit on the roadway, and 5) negotiating a series of oncoming traffic that is merging onto the roadway. The study may show that a human driver who is able to handle three of these five cognitive decisions with no problem, has a slightly increased likelihood of performing an unsafe driving act if four of the five cognitive decisions must be dealt with, and a greatly increased likelihood of having an accident if five of the five cognitive decisions must be dealt with (all as compared to letting the on-board computer autonomous control the SDV). Thus, based on the cognitive load on the driver, the system may selectively choose to let the driver control the SDV (manual mode), or may override the driver and give control of the SDV to on-board computers (autonomous mode).

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
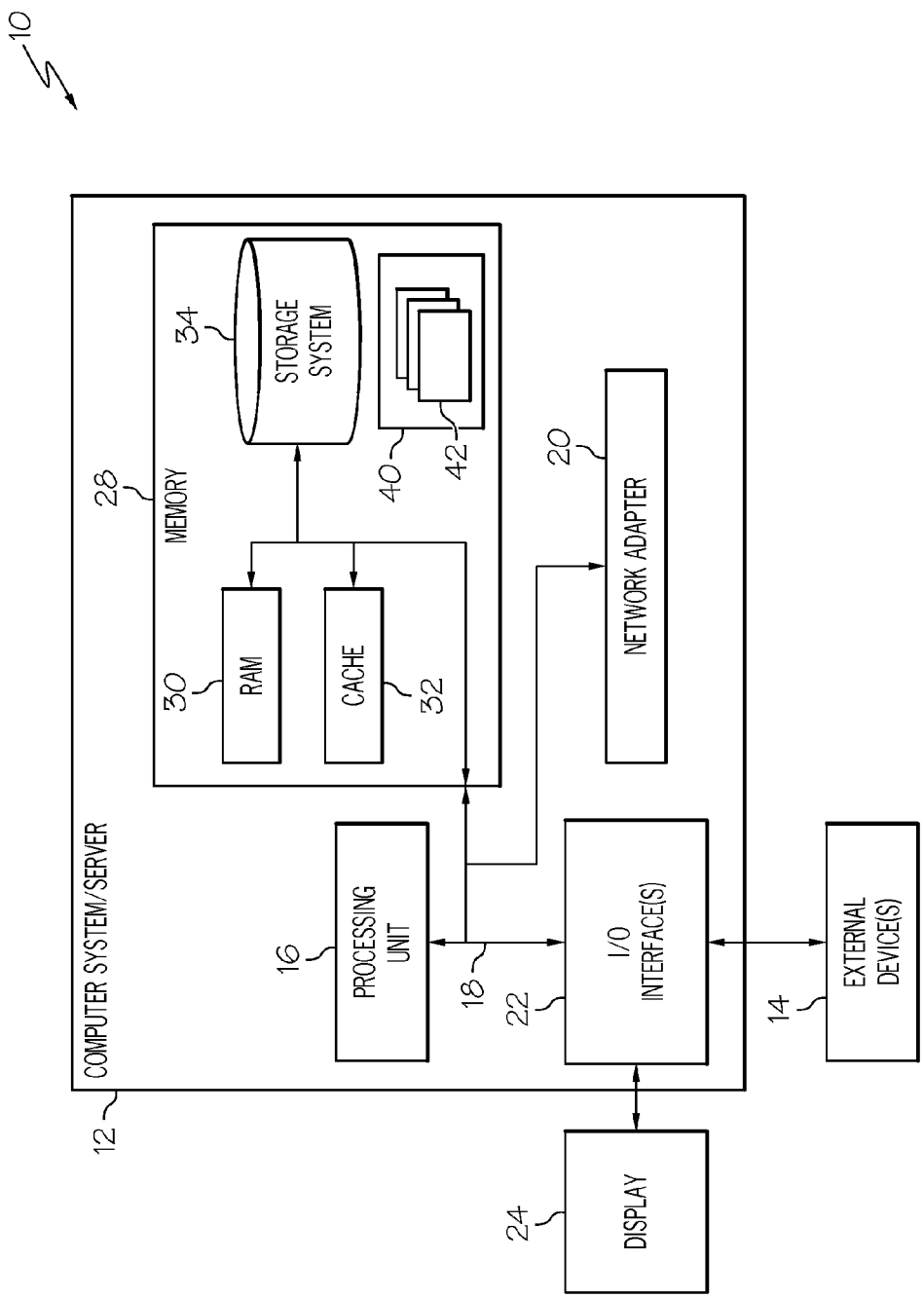
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
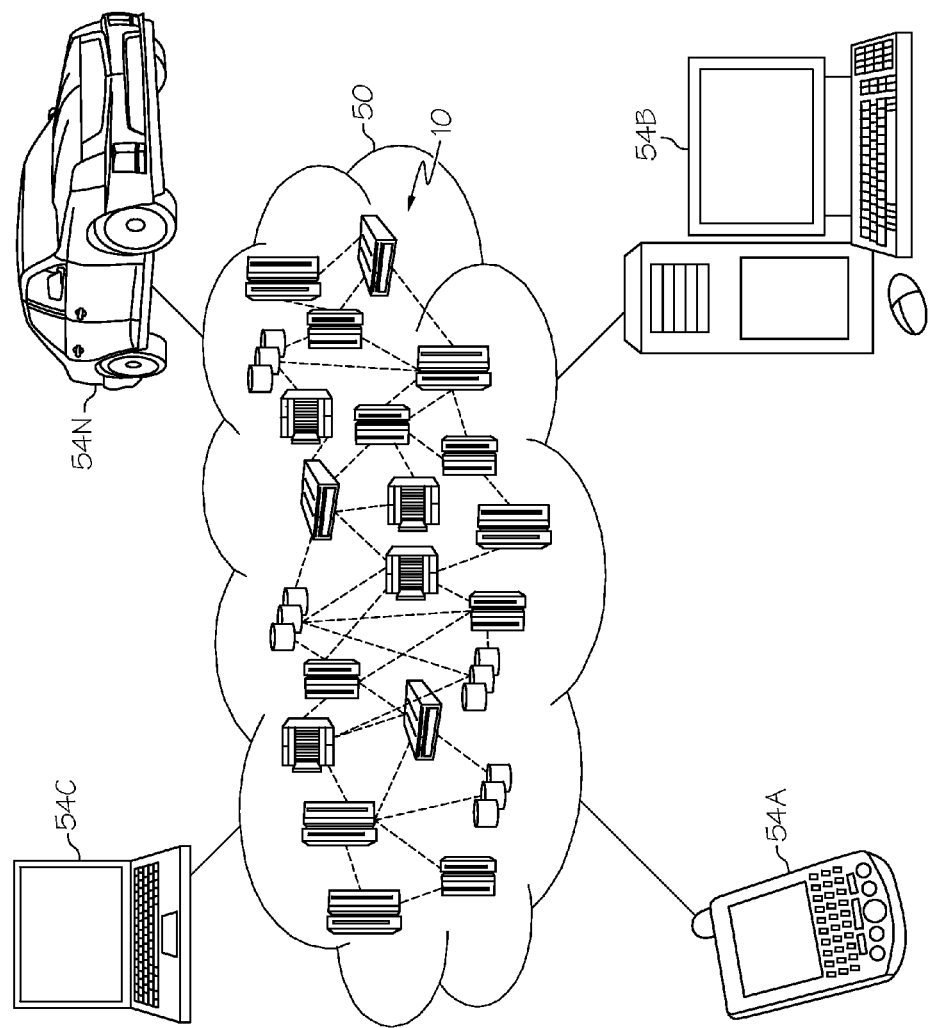
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 7 are intended to be illustrative only and that computing nodes 10 and cloud computing environment 50 can communicate with any type of computerized device over any type of network and/or network addressable connection (e.g., using a web browser).

Figure 8:
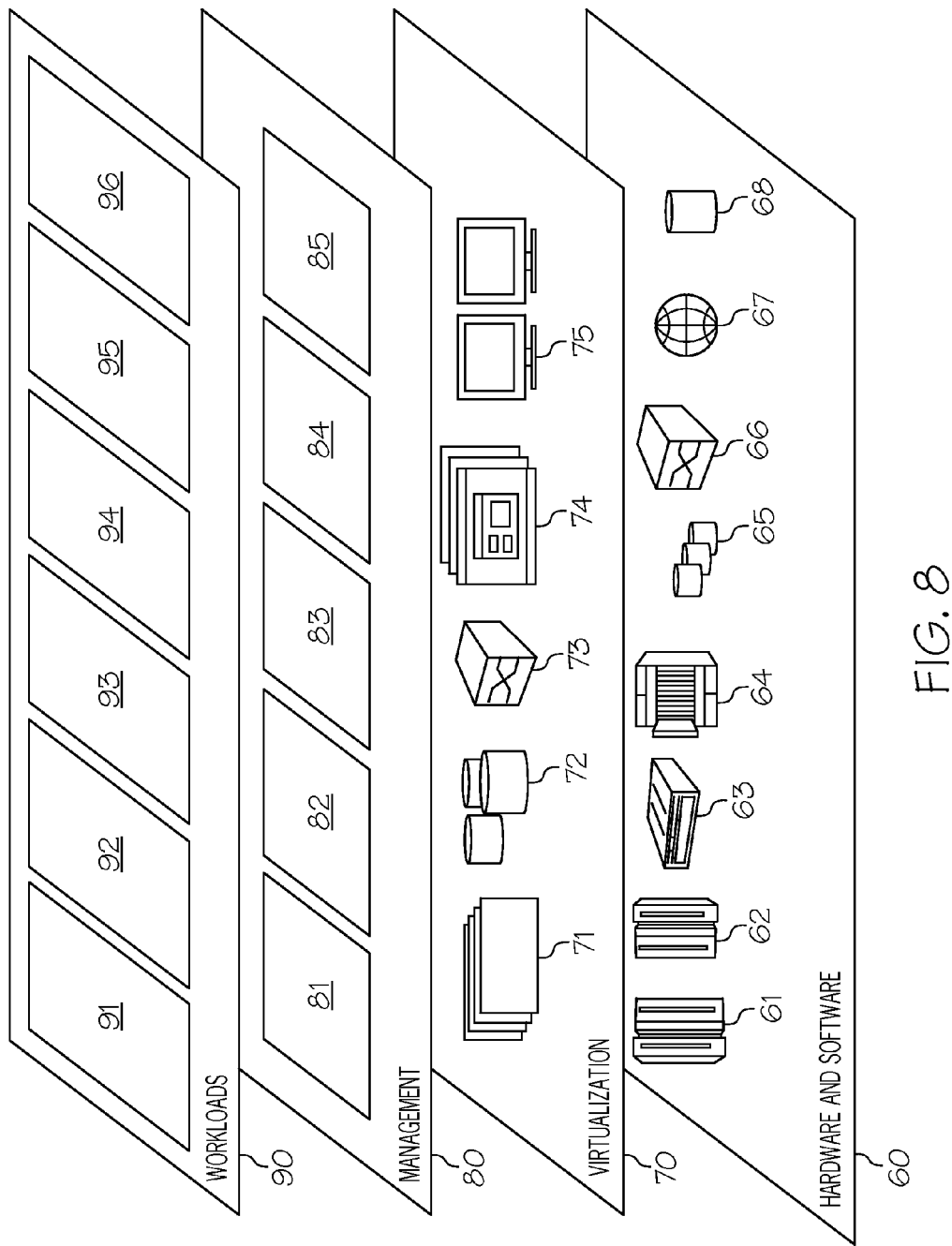
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96 (for selectively setting control of an SDV to manual or autonomous mode as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for controlling a driving mode of a self-driving vehicle (SDV), the computer-implemented method comprising:
   receiving, by one or more processors, sensor readings from a sensor, wherein the sensor readings describe a current condition of a roadway, wherein the roadway is part of a planned route of a self-driving vehicle (SDV), wherein the SDV is capable of being operated in autonomous mode by an on-board SDV control processor, wherein a driving mode module selectively controls whether the SDV is operated in the autonomous mode or in manual mode, and wherein the SDV is controlled by a human driver of the SDV if in the manual mode;
   determining, by one or more processors, a control processor competence level of the on-board SDV control processor, wherein the control processor competence level describes a competence level of the on-board SDV control processor in controlling the SDV under the current condition of the roadway;
   receiving, by one or more processors, a driver profile of the human driver of the SDV, wherein the driver profile describes a human driver competence level of the human driver in controlling the SDV under the current condition of the roadway;
   comparing, by one or more processors, the control processor competence level to the human driver competence level; and
   selectively assigning, by one or more processors, control of the SDV to the on-board SDV control processor or to the human driver based on which of the control processor competence level and the human driver competence level is relatively higher to one another.

2. The processor-implemented method of claim 1, further comprising:
   receiving, by one or more processors, a manual input, wherein the manual input describes the current condition of the roadway, and wherein the manual input overrides sensor readings that describe the current condition of the roadway;
   defining, by one or more processors, an updated current condition of the roadway based on the manual input;
   re-determining, by one or more processors, the control processor competence level of the on-board SDV control processor based on the updated current condition of the roadway from the manual input to create a re-determined control processor competence level;
   redefining, by one or more processors, the driver profile of the human driver of the SDV based on the updated current condition of the roadway from the manual input to create a redefined human driver competence level;
   comparing, by one or more processors, the re-determined control processor competence level to the redefined human driver competence level; and
   selectively assigning, by one or more processors, control of the SDV to the on-board SDV control processor or the human driver based on which of the re-determined control processor competence level and the redefined human driver competence level is relatively higher to one another.

3. The processor-implemented method of claim 1, wherein the sensor is mounted on the SDV, wherein the sensor readings describe environmental conditions of the SDV in real time, and wherein the processor-implemented method further comprises:
   receiving, by one or more processors, an environmental report from an environmental reporting service, wherein the environmental report describes a general condition for the roadway;
   comparing, by one or more processors, environmental information from the environmental report to the sensor readings that describe the environmental conditions of the SDV in real time; and in response to the environmental report disagreeing with the sensor readings, disregarding, by one or more processors, the sensor readings from the sensor and using the environmental report to describe the current condition of the roadway.

4. The processor-implemented method of claim 1,
retrieving, by one or more processors, driver profile information about the human driver of the SDV;
assigning, by one or more processors, the human driver of the SDV to a cohort of drivers traveling on the roadway in multiple SDVs, wherein the human driver of the SDV shares more than a predetermined quantity of traits with members of the cohort of drivers;
retrieving, by one or more processors, traffic pattern data for the multiple SDVs occupied by the cohort of drivers traveling on the roadway;
examining, by one or more processors, the traffic pattern data to determine a first traffic flow of the multiple SDVs occupied by members of the cohort of drivers, wherein the multiple SDVs in the first traffic flow are operating in the autonomous mode on the roadway;
examining, by one or more processors, the traffic pattern data to determine a second traffic flow of the multiple SDVs occupied by members of the cohort of drivers, wherein the multiple SDVs in the second traffic flow are operating in the manual mode on the roadway; and
in response to determining that the first traffic flow has a lower accident rate than the second traffic flow, prohibiting, by one or more processors, the SDV from operating in the manual mode.

5. The processor-implemented method of claim 1, further comprising:
receiving, by one or more processors, sensor readings from multiple sensors, wherein each of the multiple sensors detects a different type of current condition of the roadway;
weighting, by one or more processors, each of the sensor readings for different current conditions of the roadway;
summing, by one or more processors, weighted sensor readings for the different current conditions of the roadway;
determining, by one or more processors, whether the summed weighted sensor readings exceed a predefined level; and
in response to determining that the summed weighted sensor readings exceed a predefined level, prohibiting, by the on-board SDV control processor, the SDV from operating in the manual mode.

6. The processor-implemented method of claim 1, further comprising:
receiving, by one or more processors, operational readings from one or more operational sensors on the SDV, wherein the operational sensors detect a current state of mechanical equipment on the SDV;
detecting, by the one or more processors and based on received operational readings, a mechanical fault with the mechanical equipment on the SDV; and
in response to detecting the mechanical fault with the mechanical equipment on the SDV, prohibiting, by the on-board SDV control processor, the SDV from operating in the manual mode.

7. The processor-implemented method of claim 1, further comprising:
setting, by one or more processors, a minimum competence level threshold for the control processor competence level and the human driver competence level;
determining, by one or more processors, that neither the control processor competence level nor the human driver competence level exceeds the minimum competence level threshold; and
in response to determining that neither the control processor competence level nor the human driver competence level exceeds the minimum competence level threshold, directing, by the driving mode module, the on-board SDV control processor to take control of the SDV and to bring the SDV to a stop.

8. A computer program product for controlling a driving mode of a self-driving vehicle (SDV), the computer program product comprising a non-transitory computer readable storage medium having program code embodied therewith, the program code readable and executable by a processor to perform a method comprising:
receiving sensor readings from a sensor, wherein the sensor readings describe a current condition of a roadway, wherein the roadway is part of a planned route of a self-driving vehicle (SDV), wherein the SDV is capable of being operated in autonomous mode by an on-board SDV control processor, wherein a driving mode module selectively controls whether the SDV is operated in the autonomous mode or in manual mode, and wherein the SDV is controlled by a human driver of the SDV if in the manual mode;
determining a control processor competence level of the on-board SDV control processor, wherein the control processor competence level describes a competence level of the on-board SDV control processor in controlling the SDV under the current condition of the roadway;
receiving a driver profile of the human driver of the SDV, wherein the driver profile describes a human driver competence level of the human driver in controlling the SDV under the current condition of the roadway;
comparing the control processor competence level to the human driver competence level; and
selectively assigning control of the SDV to the on-board SDV control processor or to the human driver based on which of the control processor competence level and the human driver competence level is relatively higher to one another.

9. The computer program product of claim 8, wherein the method further comprises:
receiving a manual input, wherein the manual input describes the current condition of the roadway, and wherein the manual input overrides sensor readings that describe the current condition of the roadway;
defining an updated current condition of the roadway based on the manual input;
re-determining the control processor competence level of the on-board SDV control processor based on the updated current condition of the roadway from the manual input to create a re-determined control processor competence level;
redefining the driver profile of the human driver of the SDV based on the updated current condition of the roadway from the manual input to create a redefined human driver competence level;
comparing the re-determined control processor competence level to the redefined human driver competence level; and
selectively assigning control of the SDV to the on-board SDV control processor or the human driver based on which of the re-determined control processor competence level and the redefined human driver competence level is relatively higher to one another.

10. The computer program product of claim 8, wherein the sensor is mounted on the SDV, wherein the sensor readings describe environmental conditions of the SDV in real time, and wherein the method further comprises:
receiving an environmental report from an environmental reporting service, wherein the environmental report describes a general condition for the roadway;
comparing environmental information from the environmental report to the sensor readings that describe the environmental conditions of the SDV in real time; and
in response to the environmental report disagreeing with the sensor readings, disregarding the sensor readings from the sensor and using the environmental report to describe the current condition of the roadway.

11. The computer program product of claim 8, wherein the method further comprises:
retrieving driver profile information about the human driver of the SDV;
assigning the human driver of the SDV to a cohort of drivers traveling on the roadway in multiple SDVs, wherein the human driver of the SDV shares more than a predetermined quantity of traits with members of the cohort of drivers;
retrieving traffic pattern data for the multiple SDVs occupied by the cohort of drivers traveling on the roadway;
examining the traffic pattern data to determine a first traffic flow of the multiple SDVs occupied by members of the cohort of drivers, wherein the multiple SDVs in the first traffic flow are operating in the autonomous mode on the roadway;
examining the traffic pattern data to determine a second traffic flow of the multiple SDVs occupied by members of the cohort of drivers, wherein the multiple SDVs in the second traffic flow are operating in the manual mode on the roadway; and
in response to determining that the first traffic flow has a lower accident rate than the second traffic flow, prohibiting the SDV from operating in the manual mode.

12. The computer program product of claim 8, wherein the method further comprises:
receiving sensor readings from multiple sensors, wherein each of the multiple sensors detects a different type of current condition of the roadway;
weighting each of the sensor readings for different current conditions of the roadway;
summing weighted sensor readings for the different current conditions of the roadway;
determining whether the summed weighted sensor readings exceed a predefined level; and
in response to determining that the summed weighted sensor readings do not exceed a predefined level, prohibiting, via the on-board SDV control processor, the SDV from operating in the autonomous mode.

13. The computer program product of claim 8, wherein the method further comprises:
receiving operational readings from one or more operational sensors on the SDV, wherein the operational sensors detect a current state of mechanical equipment on the SDV;
detecting, based on received operational readings, a mechanical fault with the mechanical equipment on the SDV; and in response to detecting the mechanical fault with the mechanical equipment on the SDV, prohibiting, via the on-board SDV control processor, the SDV from operating in the manual mode.

14. The computer program product of claim 8, wherein the method further comprises:
setting a minimum competence level threshold for the control processor competence level and the human driver competence level;
determining that neither the control processor competence level nor the human driver competence level exceeds the minimum competence level threshold; and
in response to determining that neither the control processor competence level nor the human driver competence level exceeds the minimum competence level threshold, directing the on-board SDV control processor to take control of the SDV and to bring the SDV to a stop.

15. A computer system comprising:
a processor, a computer readable memory, and a non-transitory computer readable storage medium;
first program instructions to receive sensor readings from a sensor, wherein the sensor readings describe a current condition of a roadway, wherein the roadway is part of a planned route of a self-driving vehicle (SDV), wherein the SDV is capable of being operated in autonomous mode by an on-board SDV control processor, wherein a driving mode module selectively controls whether the SDV is operated in the autonomous mode or in manual mode, and wherein the SDV is controlled by a human driver of the SDV if in the manual mode;
second program instructions to determine a control processor competence level of the on-board SDV control processor, wherein the control processor competence level describes a competence level of the on-board SDV control processor in controlling the SDV under the current condition of the roadway;
third program instructions to receive a driver profile of the human driver of the SDV, wherein the driver profile describes a human driver competence level of the human driver in controlling the SDV under the current condition of the roadway;
fourth program instructions to compare the control processor competence level to the human driver competence level; and
fifth program instructions to selectively assign control of the SDV to the on-board SDV control processor or to the human driver based on which of the control processor competence level and the human driver competence level is relatively higher to one another; and
wherein the first, second, third, fourth, and fifth program instructions are stored on the non-transitory computer readable storage medium for execution by one or more processors via the computer readable memory.

16. The computer system of claim 15, further comprising:
sixth program instructions to receive a manual input, wherein the manual input describes the current condition of the roadway, and wherein the manual input overrides sensor readings that describe the current condition of the roadway;
seventh program instructions to define an updated current condition of the roadway based on the manual input;
eighth program instructions to re-determine the control processor competence level of the on-board SDV control processor based on the updated current condition of the roadway from the manual input to create a re-determined control processor competence level;
ninth program instructions to redefine the driver profile of the human driver of the SDV based on the updated current condition of the roadway from the manual input to create a redefined human driver competence level;
tenth program instructions to compare the re-determined control processor competence level to the redefined human driver competence level; and
eleventh program instructions to selectively assign control of the SDV to the on-board SDV control processor or the human driver based on which of the re-determined control processor competence level and the redefined human driver competence level is relatively higher to one another; and wherein
the sixth, seventh, eighth, ninth, tenth, and eleventh program instructions are stored on the non-transitory computer readable storage medium for execution by one or more processors via the computer readable memory.

17. The computer system of claim 15, wherein the sensor is mounted on the SDV, wherein the sensor readings describe environmental conditions of the SDV in real time, and wherein the computer system further comprises:
sixth program instructions to receive an environmental report from an environmental reporting service, wherein the environmental report describes a general condition for the roadway;
seventh program instructions to compare environmental information from the environmental report to the sensor readings that describe the environmental conditions of the SDV in real time; and
eighth program instructions to, in response to the environmental report disagreeing with the sensor readings, disregard the sensor readings from the sensor and using the environmental report to describe the current condition of the roadway; and wherein the sixth, seventh, and eighth program instructions are stored on the non-transitory computer readable storage medium for execution by one or more processors via the computer readable memory.

18. The computer system of claim 15, further comprising:
sixth program instructions to retrieve driver profile information about the human driver of the SDV;
seventh program instructions to assign the human driver of the SDV to a cohort of drivers traveling on the roadway in multiple SDVs, wherein the human driver of the SDV shares more than a predetermined quantity of traits with members of the cohort of drivers;
eighth program instructions to retrieve traffic pattern data for the multiple SDVs occupied by the cohort of drivers traveling on the roadway;
ninth program instructions to examine the traffic pattern data to determine a first traffic flow of the multiple SDVs occupied by members of the cohort of drivers, wherein the multiple SDVs in the first traffic flow are operating in the autonomous mode on the roadway;
tenth program instructions to examine the traffic pattern data to determine a second traffic flow of the multiple SDVs occupied by members of the cohort of drivers, wherein the multiple SDVs in the second traffic flow are operating in the manual mode on the roadway; and
eleventh program instructions to, in response to determining that the first traffic flow has a lower accident rate than the second traffic flow, prohibit the SDV from operating in the manual mode; and wherein
the sixth, seventh, eighth, ninth, tenth, and eleventh program instructions are stored on the non-transitory computer readable storage medium for execution by one or more processors via the computer readable memory.

19. The computer system of claim 15, further comprising:
sixth program instructions to receive sensor readings from multiple sensors, wherein each of the multiple sensors detects a different type of current condition of the roadway;
seventh program instructions to weight each of the sensor readings for different current conditions of the roadway;
eighth program instructions to sum weighted sensor readings for the different current conditions of the roadway;
ninth program instructions to determine whether the summed weighted sensor readings exceed a predefined level; and
tenth program instructions to, in response to determining that the summed weighted sensor readings do not exceed a predefined level, prohibit, via the on-board SDV control processor, the SDV from operating in the autonomous mode; and wherein
the sixth, seventh, eighth, ninth, and tenth program instructions are stored on the non-transitory computer readable storage medium for execution by one or more processors via the computer readable memory.

20. The computer system of claim 15, further comprising:
sixth program instructions to receive operational readings from one or more operational sensors on the SDV, wherein the operational sensors detect a current state of mechanical equipment on the SDV;
seventh program instructions to detect, based on received operational readings, a mechanical fault with the mechanical equipment on the SDV; and
eighth program instructions to, in response to detecting the mechanical fault with the mechanical equipment on the SDV, prohibit, via the on-board SDV control processor, the SDV from operating in the manual mode; and wherein
the sixth, seventh, and eighth program instructions are stored on the non-transitory computer readable storage medium for execution by one or more processors via the computer readable memory.

\* \* \* \* \*